(12) United States Patent
Lin et al.

(10) Patent No.: US 7,849,234 B2
(45) Date of Patent: Dec. 7, 2010

(54) SYSTEM FOR DETECTING A PERIPHERAL DEVICE

(75) Inventors: Hou-Yuan Lin, Taipei (TW); Chen-Shun Chen, Taipei (TW)

(73) Assignee: Giga-Byte Technology Co., Ltd., Taipei (TW)

( * ) Notice: Subject to any disclaimer, the term of this patent is extended or adjusted under 35 U.S.C. 154(b) by 207 days.

(21) Appl. No.: 12/155,297

(22) Filed: Jun. 2, 2008

(65) Prior Publication Data

US 2009/0144460 A1  Jun. 4, 2009

(30) Foreign Application Priority Data

Nov. 30, 2007 (TW) .............................. 96145804 A

(51) Int. Cl.
*G06F 3/00* (2006.01)
*G06F 13/00* (2006.01)

(52) U.S. Cl. .............................. 710/15; 710/16; 710/17; 710/18; 710/19; 710/300; 710/301; 710/302; 710/304

(58) Field of Classification Search ........................ None
See application file for complete search history.

(56) References Cited

U.S. PATENT DOCUMENTS

| | | | | |
|---|---|---|---|---|
| 5,922,060 A | * | 7/1999 | Goodrum | 710/302 |
| 6,393,586 B1 | * | 5/2002 | Sloan et al. | 714/25 |
| 2003/0014660 A1 | * | 1/2003 | Verplaetse et al. | 713/200 |
| 2005/0289274 A1 | * | 12/2005 | Ghercioiu et al. | 710/303 |
| 2008/0254822 A1 | * | 10/2008 | Tilley | 455/550.1 |

* cited by examiner

*Primary Examiner*—Alan Chen
(74) *Attorney, Agent, or Firm*—Birch, Stewart, Kolasch & Birch, LLP

(57) ABSTRACT

A system for detecting a peripheral device is used to detect whether the peripheral device is completely inserted into a peripheral interface slot of a mother board before booting. When the peripheral device is inserted into the peripheral interface slot, the system judges whether the peripheral device is completely inserted into the peripheral interface slot according to a potential of fins of the peripheral interface slot. If the system detects that the peripheral device has not been completely inserted into the peripheral interface slot before booting, a booting procedure of the mother board is interrupted and an alarm signal is output.

7 Claims, 6 Drawing Sheets

SYSTEM FOR DETECTING A PERIPHERAL DEVICE

CROSS-REFERENCE TO RELATED APPLICATIONS

This nonprovisional application claims priority under 35 U.S.C. §119(a) on Patent Application No. 096145804, filed in Taiwan on Nov. 30, 2007, the entirety of which is incorporated herein by reference.

BACKGROUND OF THE INVENTION

1. Field of the Invention

The present invention relates to a system for detecting a peripheral device, and more particularly to a system for detecting whether a peripheral device is completely inserted into a peripheral interface slot before booting.

2. Background of the Invention

In general, various peripheral devices are usually used to expand functions of a PC (personal computer). Taking a PC as an example, a general mother board will provide a plurality of PCI (peripheral component interface) slots. A user can expand functions of the mother board by inserting peripheral devices into the PCI slots.

For example, if a user wants to install a SATA hard-disk and a mother board does not have a corresponding interface, the user can expand the function of the mother board supporting SATA by adding a SATA to PCI interface.

FIG. 1 shows a flow chart for testing an insertion of a peripheral device in the prior art. A general installation process comprises: inserting a peripheral device after a PC being shut down (step S110); and detecting whether the peripheral device can operate normally during the process of booting the PC after inserting the peripheral device (step S120). However, a user will not know whether the peripheral device is completely inserted in the PCI slot during the inserting process. The inserted state of the peripheral devices has to be judged according to whether a BIOS or an operation system has been inserted into the PCI after the booting of the PC. Such a test is time and labor consuming. In addition, it may cause the peripheral device to break down if a mistake is made during the insertion. This is inconvenient for the user to install a peripheral device, and increases the maintenance cost for the manufacturer.

SUMMARY OF THE INVENTION

In view of the above problems, an object of the present invention is to provide a system for detecting a peripheral device for detecting whether the peripheral device is completely inserted into a peripheral interface slot before booting.

To achieve the above-mentioned object, the present invention provides a system for detecting peripheral device to determine whether the peripheral device is completely inserted into a corresponding peripheral interface slot of a motherboard before booting. The system includes a logic component having a plurality of input terminals, the input terminals of the logic component being electrically connected to a first test pin and a second test pin of the peripheral interface slot, respectively, wherein the first test pin and the second test pin respectively correspond to ground pins of the peripheral device when the peripheral device is inserted into the peripheral interface slot, the logic component outputting a judgment value according to a potential of the first test pin and the second test pin; and a detecting unit electrically connected to an output pin of the logic component, the detecting unit judging whether the peripheral device is inserted into the peripheral interface slot according to the judgment value, wherein when the detecting unit detects the peripheral device has not been completely inserted into the peripheral interface slot before booting.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
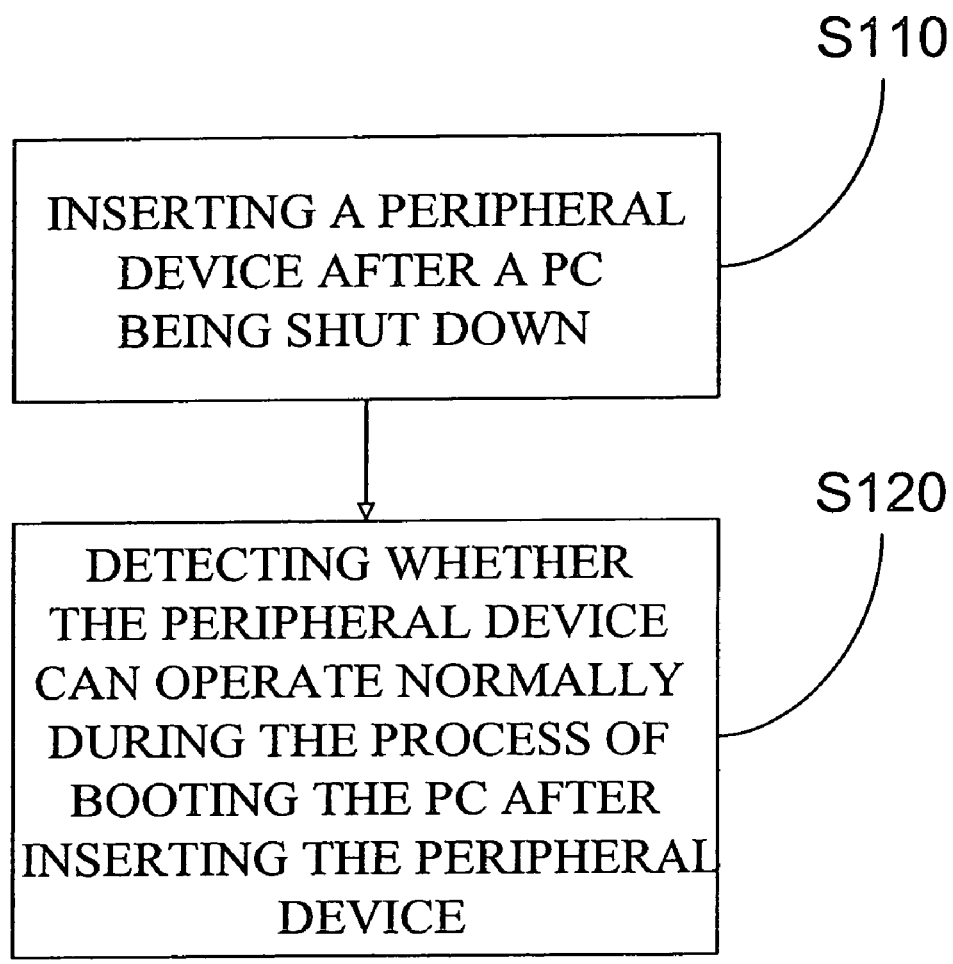
FIG. 1 is a flow chart for testing a inserting process in accordance with the prior art.

The present invention will now be described in detail with reference to the accompanying drawings, wherein the same reference numerals will be used to identify the same or similar elements throughout the several views. It should be noted that the drawings should be viewed in the direction of orientation of the reference numerals.

In accordance with an embodiment of the present invention, a system for detecting a peripheral device in a PC is provided. The system is used to detect whether the peripheral device is completely inserted into a corresponding peripheral interface slot of a mother board before booting. Taking a PC as an example in the preferred embodiment of the present invention, the PC at least comprises a mother board 210, a power supply unit 220, a peripheral device 230, a peripheral interface slot 240, and a detecting system 250, wherein an interface of the peripheral device 230 may be an interface of CPU, memory, AGP (accelerated graphics port), PCI-E, SATA or IDE (integrated device electronics).

Figure 2:
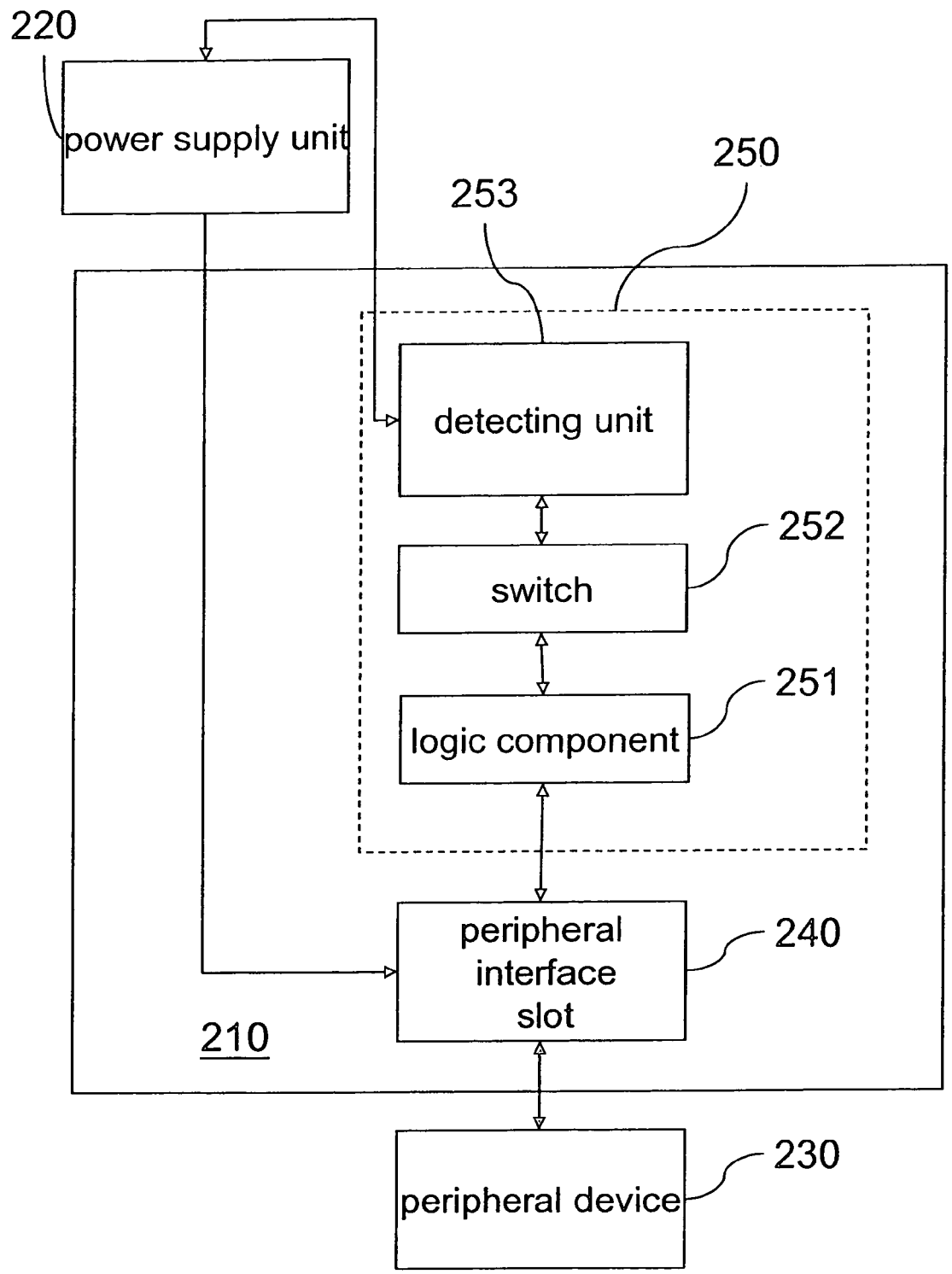
FIG. 2 is a block schematic diagram in accordance with an embodiment of the present invention.

The detecting system 250 comprises a logic component 251, a switch 252, and a detecting unit 253. FIG. 2 is a block schematic diagram in accordance with an embodiment of the present invention. The power supply unit 220 is compatible with the ATX (advanced technology extend) power supply standard. Not only does the ATX standardize the supply voltage which the mother board 210 needs when it operates, but also it standardizes the supply voltage which the peripheral device needs when the PC is being shut down. The ATX-compatible power supply respectively supply various voltages, such as +0.3V, +5V, +12V, −12V, −5V, and +5V standby. Taking +12V as an example, it is used to drive a motor of a disk driver or a cooling fan when the mother board 210 is booting, or drive the peripheral device 230 through the peripheral interface slot 240 of the mother board 210.

A general mother board 210 has a BIOS (Basic Input Output System). The BIOS can be stored in an EEPROM or other flash memories. The BIOS is used to manage the operating procedure of the mother board. The power supply unit 220 supplies a first electric power for operating the motherboard 210 and the peripheral device 230 after booting, and supplies a second electric power for the standby operation of the motherboard 210 when the motherboard 210 is shut down. The illustrated embodiment uses the second electric power, which is used when the motherboard 210 is shut down, as the detecting electric power.

Input terminals of the logic component 251 are electrically connected to a first test pin and a second test pin of the peripheral interface slot 240 respectively, wherein the first test pin and the second test pin respectively correspond to the ground pins of the peripheral device 230. When the peripheral device 230 is inserted into the peripheral interface slot 240, the logic component 251 outputs a judgment value according to potentials of the first test pin and the second test pin.

The detecting unit 253 is electrically connected to an output pin of the logic component 251, used for judging whether a peripheral device 230 is inserted into the peripheral interface slot 240 according to the judgment value. If the detecting unit 253 detects that the peripheral device 230 has not been completely inserted into the peripheral interface slot 240 before booting, the booting procedure of the motherboard is interrupted and an alarm signal is sent out.

In the illustrated embodiment, if a peripheral device 230 is not inserted into the peripheral interface slot 240, the potentials of the first test pin and second test pin of the peripheral interface slot 240 are set as a high potential. When the peripheral device 230 is completely inserted into the peripheral interface slot 240, the first test pin and the second test pin are respectively electrically connected to the ground pins of the peripheral device 230. Therefore, both the potentials of the first test pin and the second test pin will be changed from a high potential into a low potential. When the detecting module 253 detects that the potentials of the first test pin and the second test pin are low potential at the same time, it is determined that the peripheral device 230 is completely inserted into the peripheral interface slot 240.

Figure 3:
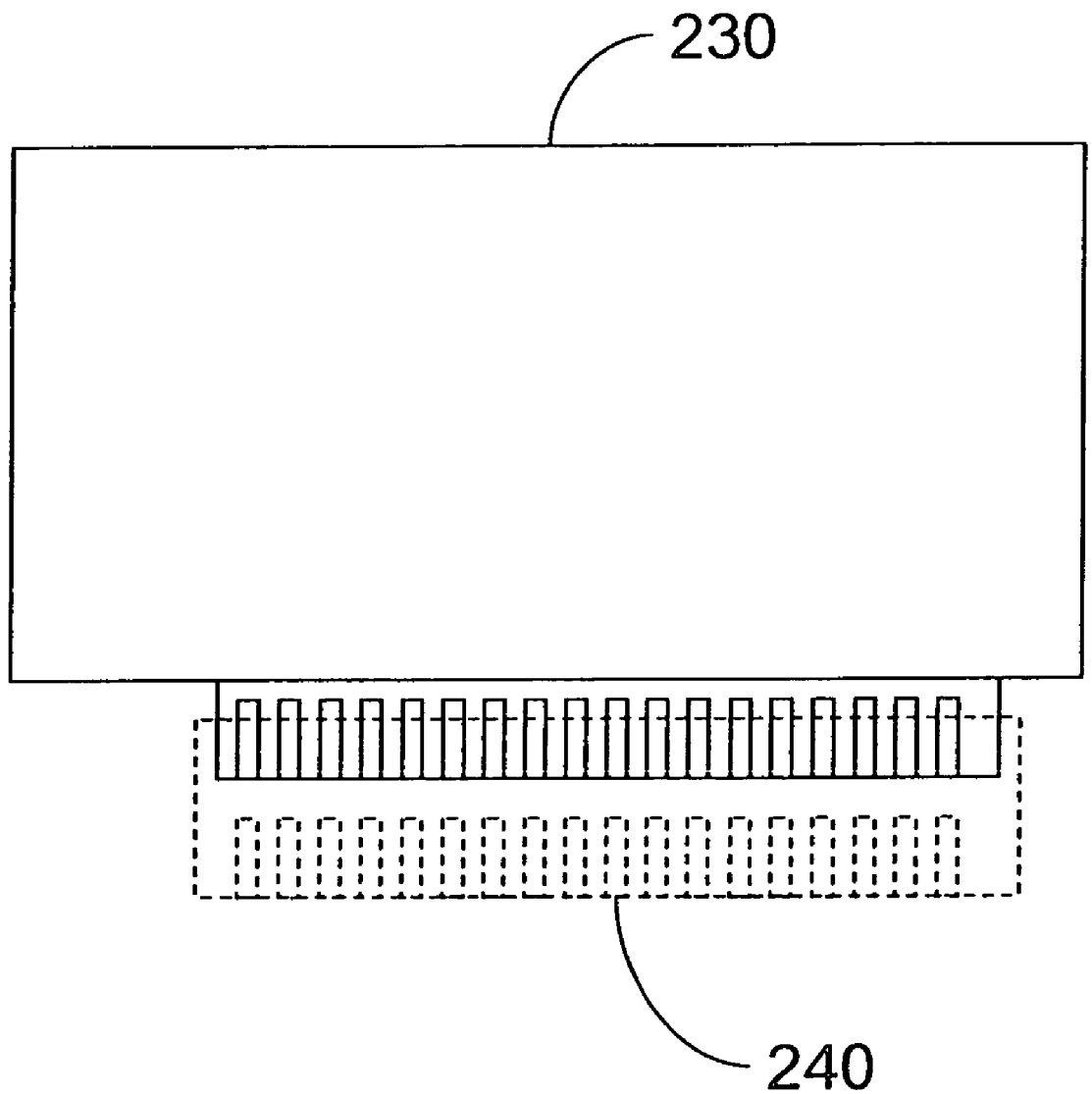
FIG. 3 is a schematic diagram of an improper installation of the peripheral device.

Several cases that the peripheral device 230 is not completely inserted into the peripheral interface slot 240 are described as follows. The first case is that the peripheral device 230 is not really inserted into the peripheral interface slot 240 because neither the first test pin nor the second test pin is electrically connected to the peripheral device 230. Therefore, the potentials of the first test pin and second test pin both keep in a high potential. FIG. 3 illustrates this case of an improper installation of the peripheral device.

Figure 4A:
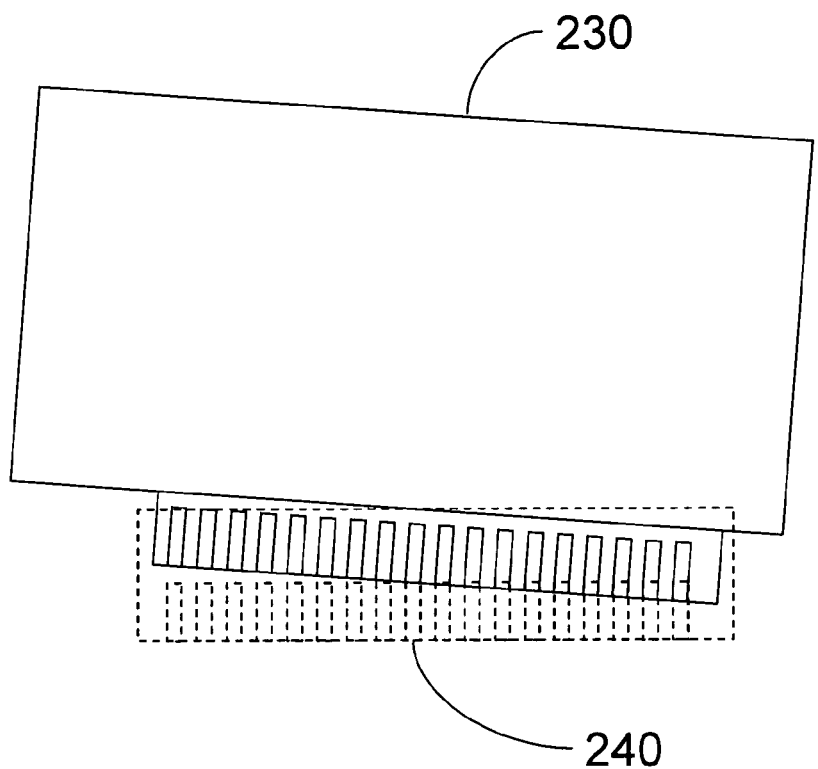
FIG. 4a is a schematic diagram of another improper installation of the peripheral device.
Figure 4B:
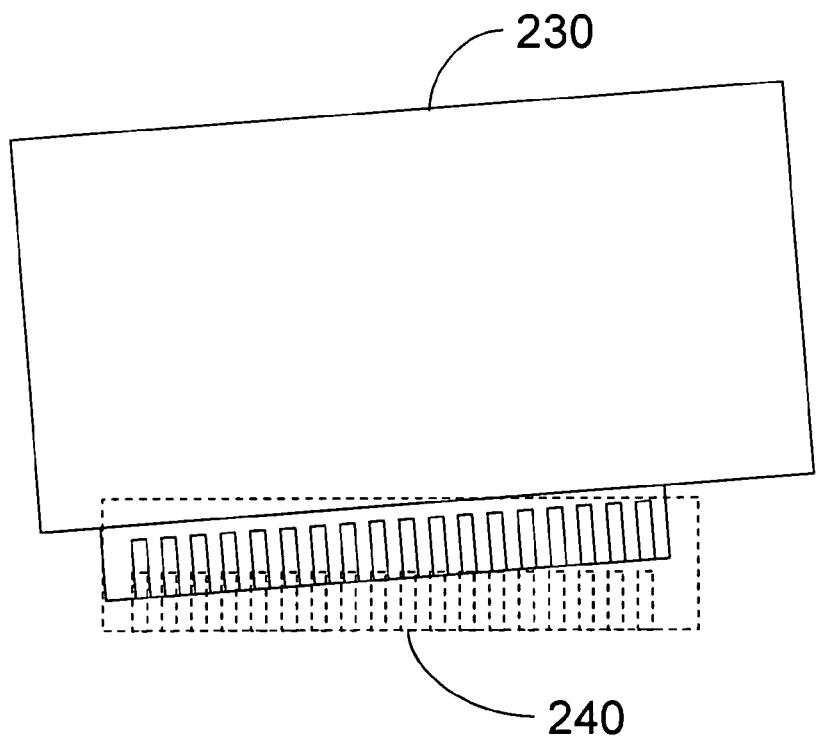
FIG. 4b is a schematic diagram of still another improper installation of the peripheral device.

The second case and the third case are that one end of the peripheral device 230 is not completely inserted into the peripheral interface slot 240, and that the potentials of the first test pin and the second test pin are not consistent. FIGS. 4a and 4b illustrate these two cases. For example, if only the first test pin is electrically connected to the peripheral device 230, the potential of the first test pin will be changed from high to low. At the same time, the second test pin is not electrically connected to the peripheral device 230, and the potential of the second test pin will still keep in a high potential.

It should be noted that the logic component 251 outputs a judgment value according to the above mentioned potential variation of the various cases being input into the logic component 251, wherein the mechanism of the judgment is implemented through the logic component 251 using an NOR gate in the illustrated embodiment.

Figure 5:
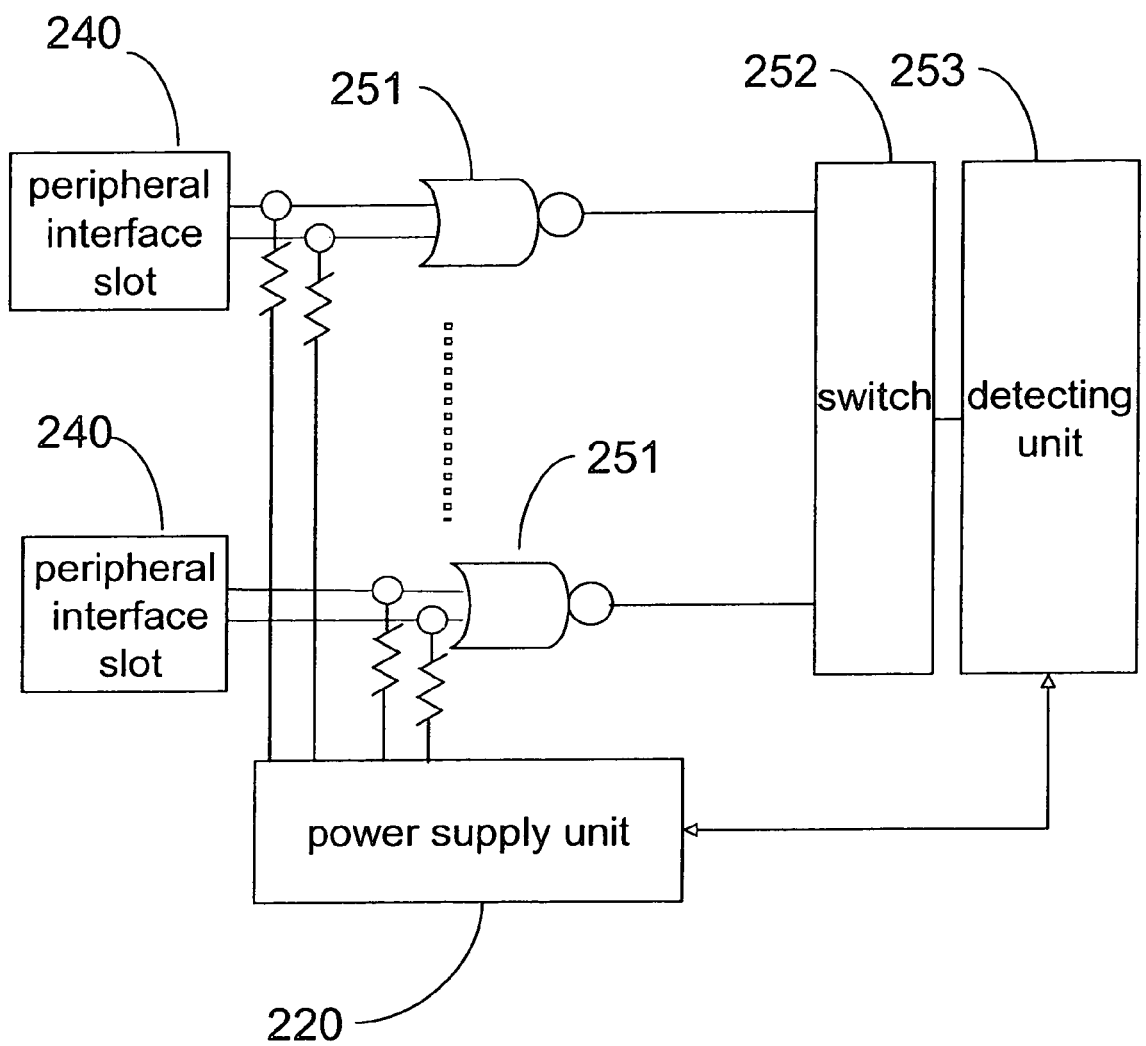
FIG. 5 is a block schematic diagram using a NOR gate in accordance with an embodiment of the present invention.

In the illustrated embodiment, the input terminals of the NOR gate are electrically connected to the first test pin and the second test pin respectively, and an output terminal of the NOR gate is electrically connected to the detecting unit. FIG. 5 is a block schematic diagram of the illustrated embodiment using a NOR gate. In accordance with Table 1 as follows, a judgment value will be output by the NOR gate according to the outputting potentials of the first test pin and the second test pin.

TABLE 1

A Truth Table of a NOR Gate

| first test pin | second test pin | output pin |
| --- | --- | --- |
| 0 | 0 | 1 |
| 0 | 1 | 0 |
| 1 | 0 | 0 |
| 1 | 1 | 0 |

In Table 1, logic "1" stands for a high potential and logic "0" stands for a low potential. When either the potential of the first test pin or the potential of the second test pin is low, the NOR gate will output logic "0". Therefore, the detecting unit 253 can judge that the peripheral device 230 is not completely inserted into the peripheral interface slot 240 when logic "0" is output. When both the potentials of the first test pin and the potential of the second test pin are both low, the output pin will send out logic "1". Therefore, the detecting unit 253 can determine that the peripheral device 230 is completely inserted into the peripheral interface slot 240 when logic "1" is output. When both the potentials of the first test pin and the potential of the second test pin are high, the output pin will send out "0". Therefore, the detecting unit 253 can confirm that the peripheral device 230 is not completely inserted into the peripheral interface slot 240 when logic "0" is output.

If the peripheral device 230 is not completely inserted into the peripheral interface slot 240, the detecting unit 253 will stop the booting procedure of the BIOS and send out an alarm signal to inform the user. A loudhailer or a LED (Light Emitting Diode) can be used to send out the alarm signal so to inform the user that the peripheral device 230 is not completely inserted. The user can check whether the peripheral device 230 is not completely inserted into the peripheral interface slot 240 according to the alarm signal. Therefore, the mother board will boot and supply power to the peripheral device 230 when it is ensured that the peripheral device 230 is completely inserted into the peripheral interface slot 240.

Figure 6:
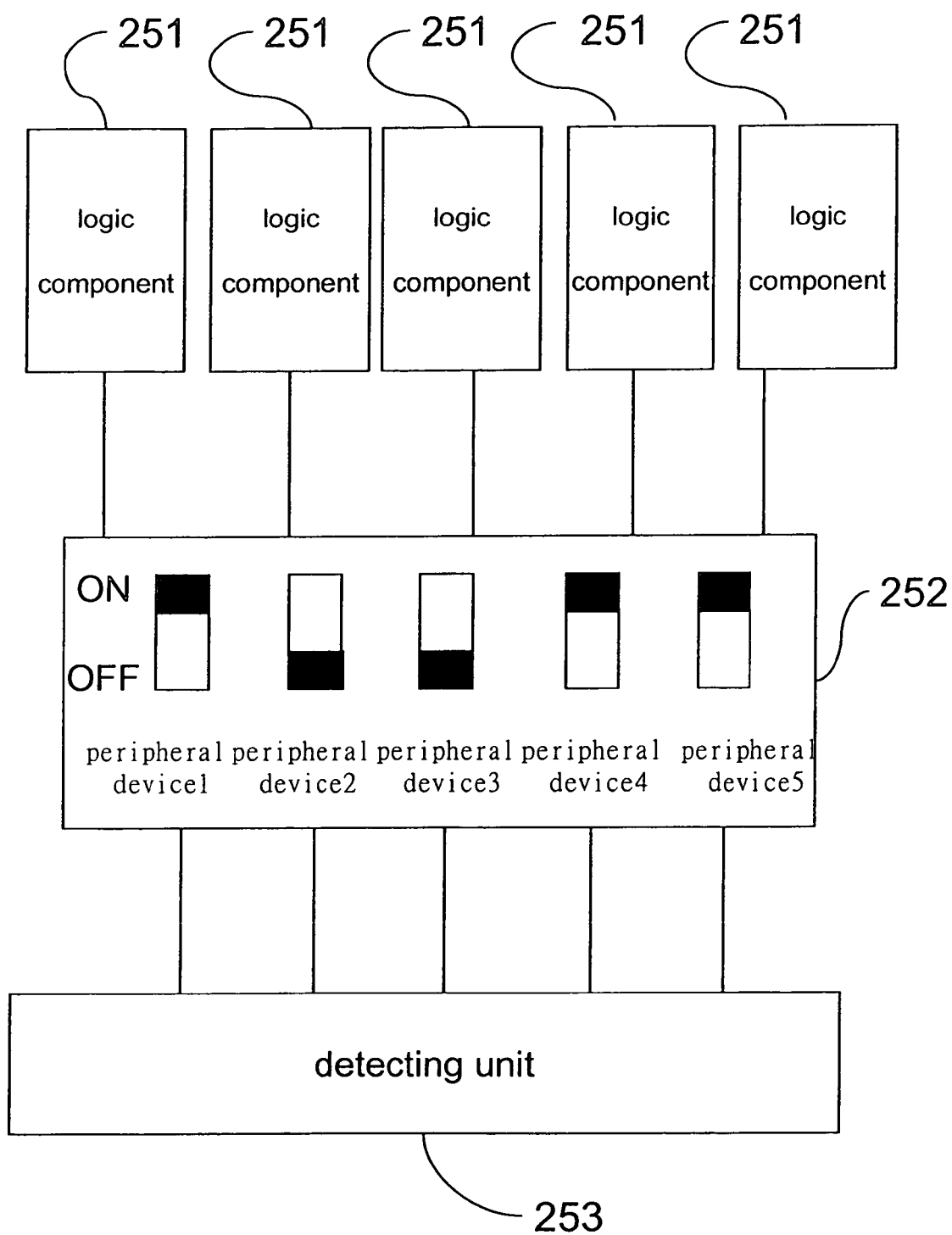
FIG. 6 is a schematic diagram of detecting a peripheral device using a dip switch in accordance with an embodiment of the present invention.

In the illustrated embodiment, a switch 252 is electrically connected between the logic component 251 and the detecting unit 253. The switch 252 is used to determine whether the peripheral device 230 should be detected by the detecting unit 253. The switch 252 can be a dip switch. The switch 252 can be realized by hardware and it can also be implemented via setting corresponding functions in the BIOS to determine which peripheral device 230 will be detected. FIG. 6 is a schematic diagram of detecting the peripheral device using a dip switch.

As shown in FIGS. 5 and 6, the switch 252 corresponds to various peripheral interface slots 240 and logic components 251. When the user considers that there is a peripheral interface slot 240 not to be tested, the user can disable the peripheral interface slot 240 via the switch 252. Therefore, the detecting unit 253 will skip the detection of the particular peripheral interface slot 240. For example, if the mother board 210 contains a built-in displaying function and a display card slot at the same time and the user sets the built-in displaying as the booting default, the user can set to skip the detection of the display card slot in order to reduce the detection time before booting.

The present invention provides a system for detecting the peripheral device 250, used to detect whether a peripheral device 230 is completely inserted into a peripheral interface slot 240 according to a potential variation of the first test pin and the second test pin before booting. If it is detected that the peripheral device 230 has not been completely inserted into the peripheral interface slot 240, a detecting unit 253 will send out a control signal to the mother board 210, which makes the mother board 210 send out an alarm signal to inform a user. At the same time, a booting procedure is interrupted to prevent the mother board 210 and the peripheral device 230 from being damaged due to the improper installation of the peripheral device 230.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A system for detecting a peripheral device to determine whether the peripheral device is completely inserted into a corresponding peripheral interface slot of a motherboard before booting, the system comprising:
   a logic component having a plurality of input terminals, the input terminals of the logic component being electrically connected to a first test pin and a second test pin of the peripheral interface slot, respectively, wherein the first test pin and the second test pin respectively correspond to ground pins of the peripheral device when the peripheral device is inserted into the peripheral interface slot, the logic component outputting a judgment value according to a potential of the first test pin and the second test pin;
   a detecting unit electrically connected to an output pin of the logic component, the detecting unit judging whether the peripheral device is inserted into the peripheral interface slot according to the judgment value, wherein when the detecting unit detects the peripheral device has not been completely inserted into the peripheral interface slot before booting, the booting procedure of the motherboard is interrupted and an alarm signal is sent out; and
   a power supply unit electrically connected to the detecting unit and the peripheral interface slot, the power supply supplying different electric power before booting and after booting.

2. A system for detecting a peripheral device to determine whether the peripheral device is completely inserted into a corresponding peripheral interface slot of a motherboard before booting, the system comprising:
   a logic component having a plurality of input terminals, the input terminals of the logic component being electrically connected to a first test pin and a second test pin of the peripheral interface slot, respectively, wherein the first test pin and the second test pin respectively correspond to ground pins of the peripheral device when the peripheral device is inserted into the peripheral interface slot, the logic component outputting a judgment value according to a potential of the first test pin and the second test pin;
   a detecting unit electrically connected to an output pin of the logic component, the detecting unit judging whether the peripheral device is inserted into the peripheral interface slot according to the judgment value, wherein when the detecting unit detects the peripheral device has not been completely inserted into the peripheral interface slot before booting, the booting procedure of the motherboard is interrupted and an alarm signal is sent out; and
   a power supply unit electrically connected to the peripheral device, for supplying a first electric power for operating the motherboard and the peripheral device after booting, and for supplying a second electric power for standby operation of the motherboard when the motherboard is shut down.

3. The system of claim 1, wherein when the peripheral device is completely inserted into the peripheral interface slot, the first test pin and the second test pin are respectively electrically connected to the ground pins, and both the potentials of the first test pin and the potential of the second test pin are changed from a high potential into a low potential.

4. The system of claim 1, wherein the logic component is a NOR gate, input terminals of the NOR gate are electrically connected to the first test pin and the second test pin respectively, and an output terminal of the NOR gate is electrically connected to the detecting unit.

5. The system of claim 1, wherein the motherboard further comprises a BIOS to manage an operation procedure of the motherboard.

6. The system of claim 5, wherein when the detecting unit detects that the peripheral device has not been completely inserted into the peripheral interface slot before booting, the BIOS controls the power supply unit to supply the a second electric power that is different from a first electric power supplied by the power supply unit after booting.

7. A system for detecting a peripheral device to determine whether the peripheral device is completely inserted into a corresponding peripheral interface slot of a motherboard before booting, the system comprising:
   a logic component having a plurality of input terminals, the input terminals of the logic component being electrically connected to a first test pin and a second test pin of the peripheral interface slot, respectively, wherein the first test pin and the second test pin respectively correspond to ground pins of the peripheral device when the peripheral device is inserted into the peripheral interface slot, the logic component outputting a judgment value according to a potential of the first test pin and the second test pin;
   a detecting unit electrically connected to an output pin of the logic component, the detecting unit judging whether the peripheral device is inserted into the peripheral interface slot according to the judgment value, wherein when the detecting unit detects the peripheral device has not been completely inserted into the peripheral interface slot before booting, the booting procedure of the motherboard is interrupted and an alarm signal is sent out; and
   a dip switch to determine whether the peripheral device is detected by the detecting unit.

* * * * *